3 Sheets—Sheet 1.
9804X
T. COOK.
MACHINE FOR RAISING VESSELS.
Patented June 30, 1836.
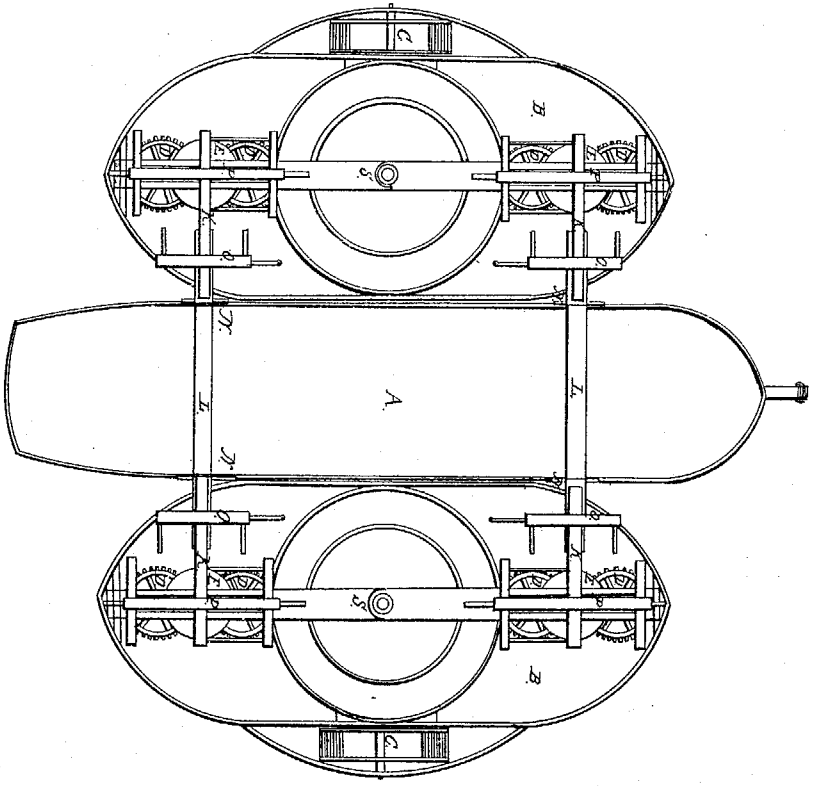

9804X
3 Sheets—Sheet 2.
T. COOK.
MACHINE FOR RAISING VESSELS.
Patented June 30, 1836.
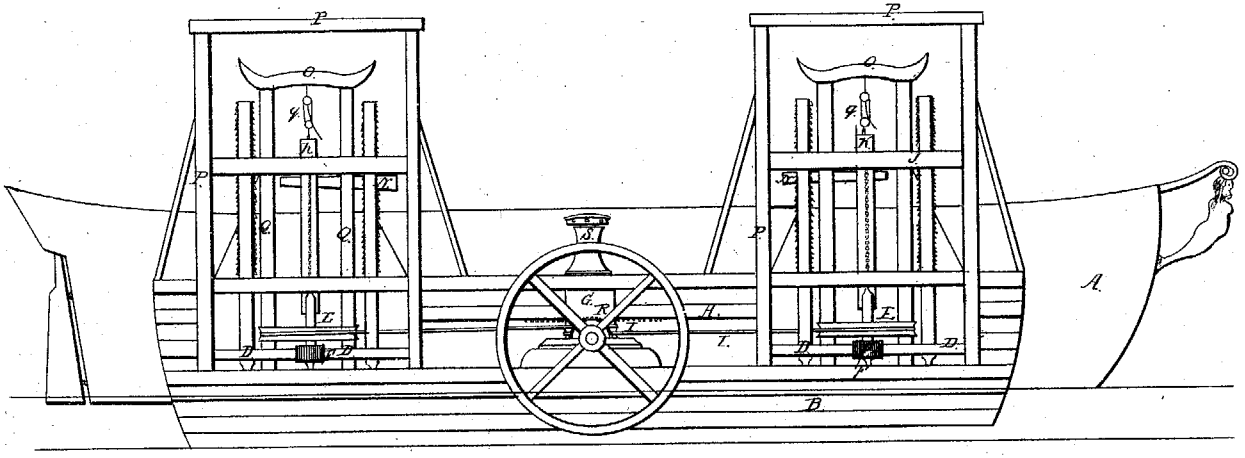

9804X
3 Sheets—Sheet 3.
T. COOK.
MACHINE FOR RAISING VESSELS.
Patented June 30, 1836.
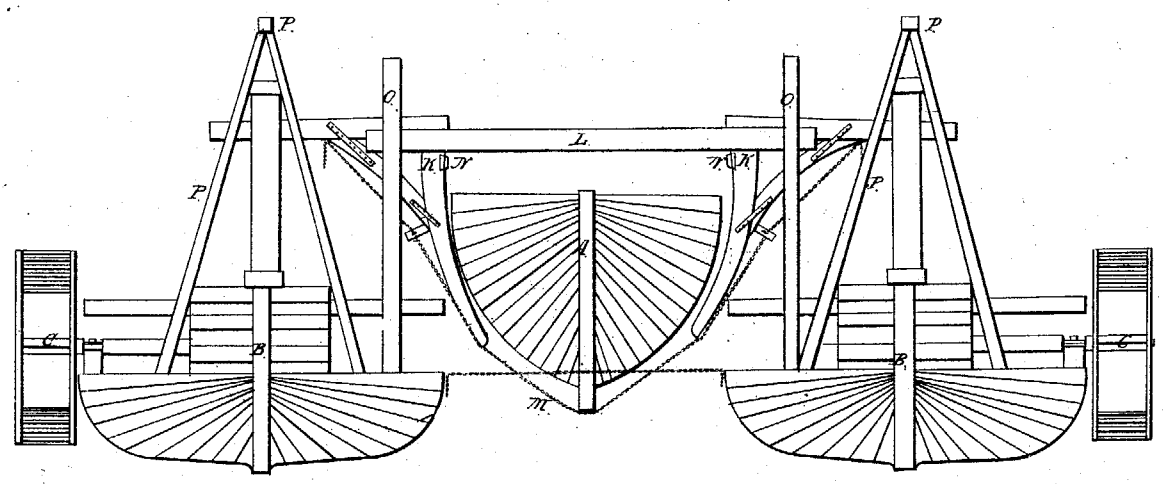

9804X

Tobias Cook of Scituate Massachusetts

Letters Patent.

The schedule referred to in these Letters Patent and making part of the same, containing a description in the words of the said Tobias Cook, himself of his improvement in the machinery or apparatus for raising vessels when in the water, without un= loading.

To all Persons to whom these presents shall come

I Tobias Cook of Scituate in the county of plymouth and State of Massachusetts Master Mariner have invented new and useful machinery and apparatus, for raising vessels of all sizes when in the water, without unloading them – and the following specifications are an exact description of the same. A. represents the vessel to be raised B. represents the lighter by which the vessel A, is to be raised; C. represents the water wheels by which the vessels are propelled especially in a calm, or with adverse winds D. represents notched or driver wheels and screws, which raise the beam upon which rests the ~~cranks~~ cranes marked K, E, represents the band or driver wheels. H. represents the jack or notched wheels upon the shaft of the driver below, and which carries the driver wheels, & screws thereby raising the beam. f. G. represents the drum below, and connected with the tread wheel, H, around which passes a chain band from the driver wheel, E, H represents the tread wheels upon which the horse, or horses travel. I repre- sents chain bands which pass around and from the drums G. to the driver wheels E, f. represents the beams, through which the screws D, pass, and upon which rest the cranes marked K, K. represents the cranes which rest upon the beams marked f, and to which the upper ends of the chains all, are confined, and to which also said chains are fastened at the middle, and lower ends
L. represents two beams which pass from the cranes K. across and above
the deck of the vessel A. to prevent the lighters B. from crowding
against the vessel to be raised. M. represents two chains which
pass under the keel of the vessel A, and is confined to the cranes K.
and by which the vessel A, is to be raised. N. represents a rest
or bearer dovetailed [illegible] into the cranes K, upon which rest the beams
marked L. O. represents a gallows by which the cranes K. are raised
P. represents tackles by which the cranes K are raised by being an
fixed to the gallows cap, Q. represents a stout wooden braced frame
in the sides of which are grooves, where the ends of the beams J. play
to keep them steady, R. represents a notched wheel, upon the
shaft of the water wheel, B. which is carried by segments placed
underneath the tread-wheel, S. represents two sets of stairs upon the
heads of the shafts of Drums G. T. represent two chains fastened
to the bows of the lighters B. to prevent their spreading.

It will be seen by the within specification that the purchase is
by the screws H. playing in beams J. thereby raising cranes K. to
which are fastened the chains marked M, and which chains
pass under the vessel A. —

Having now described the nature of my invention, and
the manner in which the same is to be performed and carried into
effect, I would have it understood, that I lay no claim to any
of the various parts taken separately, — But I do claim as my
invention the combining of the various parts in the manner above
described — In witness whereof I have hereunto set my hand

Witnesses
E. Raymond
B. K. Merrill

Tobias Cook.

Drawing

[616 wds]